United States Patent [19]

Kawakami et al.

[11] 4,042,438

[45] Aug. 16, 1977

[54] METHOD OF ASSEMBLING A DIAPHRAGM ASSEMBLY FOR AN ELECTRO-ACOUSTIC TRANSDUCER

[75] Inventors: Hirotake Kawakami; Kantaro Takada; Toru Fukumoto, all of Tokyo, Japan

[73] Assignee: Sony Corporation, Tokyo, Japan

[21] Appl. No.: 595,438

[22] Filed: July 14, 1975

[30] Foreign Application Priority Data

July 16, 1974 Japan .................................. 49-81499

[51] Int. Cl.[2] .......................... C09J 7/02; H04R 7/06

[52] U.S. Cl. .................................... 156/272; 156/306; 156/321; 156/333; 179/111 E; 181/170; 307/88 ET

[58] Field of Search ............... 156/275, 272, 306, 309, 156/311, 321, 228, 333; 181/148, 157, 158, 167, 168, 170, 171; 179/110 A, 138 R, 181 R, 111 R, 111 E; 307/88 ET

[56] References Cited

U.S. PATENT DOCUMENTS

| | | | |
|---|---|---|---|
| 1,972,345 | 9/1934 | Jensen | 181/171 |
| 2,998,343 | 8/1961 | Gold et al. | 156/275 |
| 3,159,719 | 12/1964 | Weiss | 181/170 X |
| 3,190,972 | 6/1965 | Schoeps et al. | 181/158 X |
| 3,563,828 | 2/1971 | Marshall | 156/321 X |
| 3,749,621 | 7/1973 | Shoffner | 156/272 X |
| 3,755,043 | 8/1973 | Igarashi et al. | 156/272 |
| 3,845,544 | 9/1972 | Nurminen et al. | 156/275 |
| Re. 28,420 | 5/1975 | Murphy | 179/111 E |

*Primary Examiner*—Douglas J. Drummond
*Assistant Examiner*—M. G. Wityshyn
*Attorney, Agent, or Firm*—Lewis H. Eslinger; Alvin Sinderbrand

[57] ABSTRACT

In assembling at least one metal frame in abutting supporting relation to a diaphragm to form a diaphragm assembly for an electro-acoustic transducer, for example, as in a microphone or headphone, the diaphragm, which may be an electret, is formed at least in part of a thermoplastic resin so as to provide the latter at each surface of the diaphragm which, in the abutting supporting relation, is engaged by a surface of a metal frame, and the frame or frames and the diaphragm are pressed together in the desired abutting supporting relation while each metal frame is heated so that heat is transmitted through the latter to melt the thermoplastic resin at the engaged surfaces of the diaphragm and frame or frames, whereupon the heating of the frame or frames is halted so that the thermoplastic resin hardens to bond together the diaphragm and frame or frames in the desired abutting supporting relation.

2 Claims, 3 Drawing Figures

METHOD OF ASSEMBLING A DIAPHRAGM ASSEMBLY FOR AN ELECTRO-ACOUSTIC TRANSDUCER

BACKGROUND OF THE INVENTION

1. Field of the Invention

This invention relates to the production of electro-acoustic transducers, such as, electrostatic or condenser microphones or speakers of the type used in headphones of audio equipment, and more particularly is directed to improvements in the production of the diaphragm assemblies for such electro-acoustic transducers.

2. Description of the Prior Art

In existing electro-acoustic transducers of the described type, it is known to provide a diaphragm constituted by a thin film of a high polymer electric insulating resin which is capable of the long retention of an electric charge applied thereto, for example, by irradiation with electrons or a corona discharge, so as to form an electret. The electret diaphragm is then mounted in spaced parallel relation to either a single fixed electrode or between a pair of fixed electrodes to form an electro-acoustic transducer. When the electret diaphragm is associated with only a single fixed electrode, a conductive metal layer of gold, aluminum or the like is vapor deposited on the surface of the diaphragm which faces away from the fixed electrode. In either case, that is, whether the electro-acoustic transducer has a single fixed electrode or a pair of fixed electrodes, the electret diaphragm is supported, at its periphery, by one or more metal frames which maintain the diaphragm in spaced relation to the fixed electrode or electrodes. Since the high polymer film employed for the electret diaphragm is very thin, for example, has a thickness of only approximately 2 to 60 microns, it is desirable that such film be securely attached, while under tension, to the associated metal frame or frames so that the latter will support the diaphragm and provide a convenient means by which the diaphragm can be handled when assembling the electro-acoustic transducer.

In the prior art, it has been the usual practice to adhesively secure the diaphragm to its supporting frame or frames by applying a coating or coatings of epoxy resin to the diaphragm and then pressing the frame or frames against the epoxy resin coated surface of surfaces of the diaphragm while the latter is tensioned until the epoxy resin sets or hardens. However, the foregoing process for securing the metal frame or frames to the diaphragm is relatively complicated and time consuming.

OBJECTS AND SUMMARY OF THE INVENTION

Accordingly, it is an object of this invention to provide an improved method for assembling together a diaphragm and its supporting frame or frames so as to form the diaphragm assembly of an electro-acoustic transducer.

Another object is to provide a method, as aforesaid, which is relatively simple and capable of being rapidly completed so as to promote the inexpensive mass production of diaphragm assemblies for electro-acoustic transducers.

In accordance with an aspect of this invention, at least one metal frame member is assembled in abutting supporting relation to a diaphragm member to form a diaphragm assembly for an electro-acoustic transducer by providing at least one of the frame and diaphragm members with at least a layer of thermoplastic resin at each surface of said one member which, in the abutting supporting relation, is engaged by a surface of the other of the frame and diaphragm members, and pressing together the frame and diaphragm members in the desired abutting supporting relation while heating each frame member so that heat is transmitted through each frame member to melt the thermoplastic resin at the engaged surfaces of the frame and diaphragm members, whereupon the heating of the frame member or members is halted to permit the thermoplastic resin to harden for bonding together the frame and diaphragm members in the desired abutting supporting relation.

In preferred embodiments of this invention, the diaphragm member is constituted, at least in part, by the layer of thermoplastic resin, and the diaphragm member is electrically charged to form an electret.

The above, and other objects, features and advantages of the invention, will be apparent in the following detailed description of illustrative embodiments thereof which is to be read in connection with the accompanying drawings.

DESCRIPTION OF PREFERRED EMBODIMENTS

Figure 2:
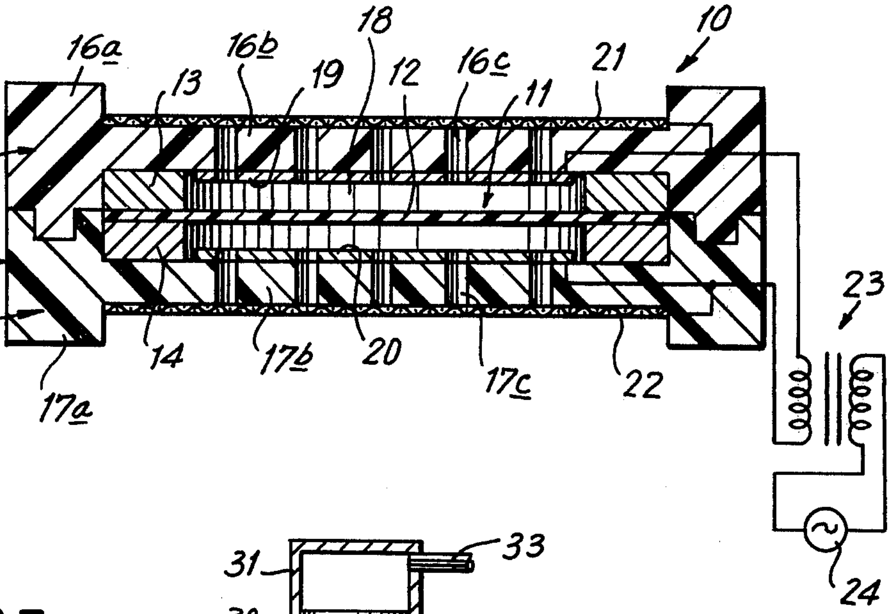
FIG. 2 is a schematic sectional view showing an electro-acoustic transducer including a diaphragm assembly produced by the method illustrated on FIG. 1.

Referring to the drawings in detail, and initially to FIG. 2 thereof, it will be seen that an electro-acoustic transducer 10 of a type to which the present invention can be applied may constitute an electrostatic or condenser microphone or speaker, for example, of the kind used in the headphones for audio equipment. The illustrated electro-acoustic transducer 10 is shown to comprise a diaphragm assembly 11 made up of a diaphragm member 12 which is supported, at its periphery, by frame members 13 and 14 which are secured to the opposite sides of diaphragm member 12 in abutting supporting relation to the latter. Electro-acoustic transducer 10 is further shown to comprise a casing 15 made up of complementary casing members 16 and 17 which include interfitting rim portions **16*a* and 17*a* extending around the peripheries of respective walls 16*b* and 17*b* which are held in spaced parallel relation to define a cavity 18 therebetween for accommodating diaphragm assembly 11. Electrodes 19 and 20 of aluminum or any other suitably conductive metal are provided on the inner surfaces of walls 16*b* and 17*b*, respectively, for example, by vapor deposition, and are held in spaced relation to diaphragm member 12 by the frame members 13 and 14. Perforations or holes 16*c* and 17*c* extend through walls 16*b* and 17*b* and the respective electrodes 19 and 20. Further, the outer surfaces of walls 16*b* and 17*b* are shown to be covered by electric shielding metallic meshes 21 and 22, respectively, which are preferably connected electrically with the adjacent electrodes 19 and 20**, respectively.

The diaphragm 12 has an electrical charge applied thereto, for example, diaphragm 12 may constitute an electret which permanently retains an electric charge applied thereto prior to assembly in electro-acoustic transducer 10. Electrodes 19 and 20 are connected to the opposite ends of the secondary winding of a transformer 24 which has its primary winding connected to an audio signal source 24. In response to the audio signal from source 24, diaphragm 12 is driven in a push-pull manner and acts at its opposite sides, on the air entering cavity 18 through holes or apertures 16*c* and 17*c* so as to produce corresponding audible sounds. Of course, the electro-acoustic transducer 10 described above with reference to FIG. 2 may also operate as a microphone in which case sound waves acting on diaphragm 12 through holes or apertures 16*c* and 17*c* vibrate diaphragm 12 relative to fixed electrodes 19 and 20 to vary the capacitance therebetween and such changes in capacitance are employed to provide a corresponding electrical signal.

The present invention relates generally to the diaphragm assembly 11, and more particularly to the method by which metal frame members 13 and 14 are assembled in abutting supporting relation to diaphragm member 12 to form the assembly 11 for inclusion in the electro-acoustic transducer 10. Generally, in accordance with invention, either the diaphragm member 12 or each of the frame members 13 and 14 is provided with at least a layer of thermoplastic resin at each surface of the frame or diaphragm member which, in the desired abutting supporting relation, is engaged by a surface of the diaphragm or frame member, respectively, and the frame and diaphragm members are pressed together in the desired abutting supporting relation while applying heat to each metal frame member so that heat transmitted through the latter causes the thermoplastic resin to melt at the engaged surfaces of the frame and diaphragm members, whereupon the heating of each frame member is halted so that the thermoplastic resin hardens to bond the frame and diaphragm members to each other in the desired abutting supporting relation.

Figure 1:
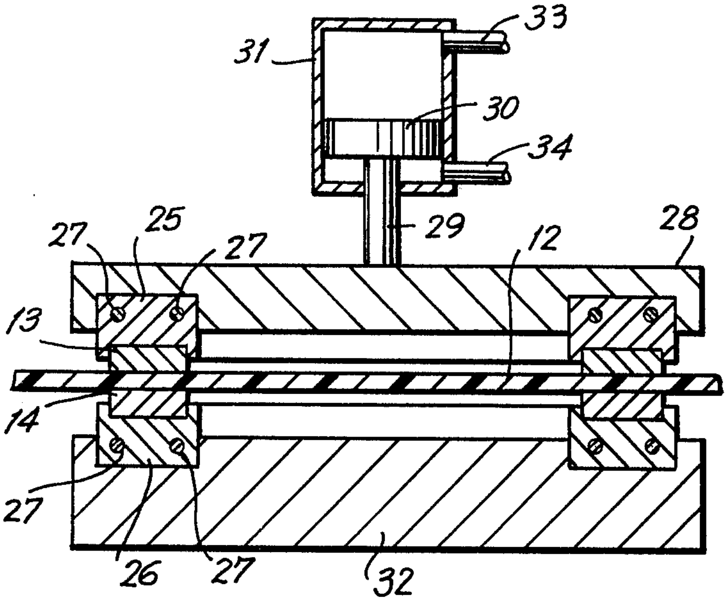
FIG. 1 is a schematic sectional view illustrating the assembling together, by a method according to an embodiment of this invention, of diaphragm and frame members to form a diaphragm assembly for an electro-acoustic transducer.

More particularly, as shown on FIG. 1, in a method according to this invention, the diaphragm member 12 may be formed entirely of a film of high polymer thermoplastic resin, such as, for example, fluorinated ethylene-propylene resin (FEP resin) which has a melting point of approximately 285°–295° C. The thermoplastic resin film constituting diaphragm member 12 may have a thickness of from about 12 to several hundred microns and is interposed between the metal frame members or rings 13 and 14 which may be formed of aluminum, stainless steel, brass or the like. In order to simultaneously heat frame members 13 and 14 while the latter are pressed towards each other with the thermoplastic resin film therebetween, frame members 13 and 14 may be disposed in suitably shaped recesses of metal locating members 25 and 26, respectively, which have electrical heating elements 27 incorporated therein. The locating member 25 may be secured to an overhead support 28 which is mounted for vertical movement for example, suspended from a rod 29 which depends from a piston 30 slidable vertically in a cylinder 31, while the locating member 26 is fixed on a base or support 32 which is suitably positioned below the overhead support 28, as shown on FIG. 1. Air under pressure may be introduced into cylinder 31 either above or below piston 30 for example, through the illustrated conduit 33 or conduit 34, respectively, so as to either urge locating member 25 downwardly toward locating member 26 or to raise locating member 25 away from member 26.

In operating the apparatus of FIG. 1 for performing the method according to this invention, frame members 13 and 14 are disposed in the recesses of the respective locating members 25 and 26 with the member 25 being initially in its inoperative or raised position, and the heating elements 27 are energized so as to heat frame members 13 and 14 to a temperature above the melting point of the thermoplastic resin which forms diaphragm member 12, for example, to a temperature in the range between about 350° and 380° C in the case where diaphragm member 12 is formed of FEP resin. With frame members 13 and 14 being thus heated and with the thermoplastic resin film which is to form the diaphragm member 12 being suitably tensioned between frame members 13 and 14, air under pressure is admitted to cylinder 31 above piston 30, that is, through conduit 33, so as to urge locating element 25, downwardly and thereby press heated frame members 13 and 14 together with the thermplastic resin film therebetween. In the case where diaphragm member 12 is formed of FEP resin and frame members 13 and 14 are heated to within the above indicated temperature range, it has been found that suitable melting of such thermoplastic resin occurs at the surfaces of diaphragm member 12 engaged by frame members 13 and 14 when the latter are pressed against the diaphragm member for approximately 2 to 3 seconds with the pressure of air in cylinder 31 being selected to provide a pressure of frame members 13 and 14 against diaphragm member 12 in the range between approximately 2.5 and 4.0 $Kg/cm^2$. Thereafter, the energizing of heating elements 27 is terminated to halt the heating of frame members 13 and 14 and the latter are cooled gradually, either by ambient air or by a flow of cooling air suitably directed thereagainst, so that the thermoplastic resin hardens for securely bonding frame members 13 and 14 to diaphragm member 12 at their engaging surfaces. When the thermoplastic resin has hardened sufficiently to retain frame members 13 and 14 in the desired abutting supporting relation to diaphragm member 12, air under pressure may be supplied through conduit 34 to cylinder 31 below piston 30 for raising support 28 and thereby permitting the removal of frame members 13 and 14 from locating members 25 and 26. Finally, the thermoplastic resin film projecting beyond frame members 13 and 14 may be trimmed away and the diaphragm member 12 of the resulting assembly 11 may be electrically charged, for example, by exposure to an electron beam or a corona discharge.

It will be apparent that, in the embodiment of the invention described above, the electret diaphragm member 12 is formed entirely of thermoplastic resin which functions both to bond the frame members 13 and 14 to the diaphragm member and to substantially permanently retain the electrical charge on the diaphragm member, for example, for approximately 8 to 10 years in the case where the thermoplastic resin is fluorinated ethylene-propylene (FEP resin). However, if desired, the electret diaphragm may be formed of a lamination of a thermoplastic resin film for bonding to a frame member and of a plastic resin film having superior retention of the electrical charge.

Figure 3:
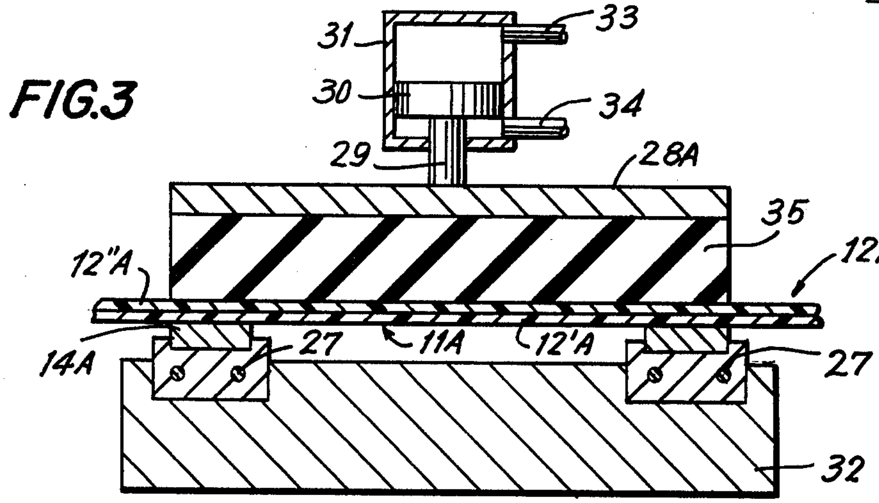
FIG. 3 is a schematic sectional view similar to that of FIG. 1, but illustrating another embodiment of the invention for producing a diaphragm assembly for an electro-acoustic transducer.

For example, as shown on FIG. 3, the diaphragm member 12A of a diaphragm assembly 11A produced by a method embodying this invention may be comprised of thermoplastic resin film 12'A, for example, of fluorinated ethylene-propylene, which is laminated with another plastic resin film 12"A, for example, of polytetrafluoroethylene (TFE resin) which is a thermosetting resin capable of retaining an electric charge applied thereto for approximately 20 years.

Further, although the diaphragm assembly 11 has two frame members 13 and 14 bonded to the opposite sides of its diaphragm member 12, the method according to this invention may also be employed for producing a diaphragm assembly having its diaphragm member supported by only a single frame member. For example, as shown on FIG. 3, a single metal frame member 14A may be assembled with the previously described diaphragm member 12A to constitute the diaphragm assembly 11A.

In producing the assembly 11A by the method according to this invention, the single metal frame member 14A may be disposed in the suitably shaped recess of locating member 26 which, as in the embodiment of FIG. 1, incorporates electric heating elements 27 and is mounted on a fixed base or support 32. In this case, the overhead support 28A which is vertically movable by the suitably controlled admission of air under pressure to the associated cylinder 31 has a heat-insulating body 35, for example, of silicone rubber, depending therefrom. When using the apparatus of FIG. 3 for producing the diaphragm assembly 11A, the metal frame member 14A is disposed on locating member 26 to be heated to a temperature above the melting point of the thermoplastic resin of film or layer 12'A in response to energizing of heating elements 27. With the laminated films or diaphragm member 12A suitably tensioned above heated frame member 14A and arranged with its thermoplastic film or layer 12'A facing downwardly, air under pressure is admitted through conduit 33 to cylinder 31 above piston 30 so that the heat-insulating body or back-up member 35 is displaced downwardly to apply the requisite pressure between thermoplastic resin layer 12'A and heated frame member 14A for obtaining melting of the thermoplastic resin layer at the area of its engagement with the heated frame member. Then, as before, the heating of frame member 14A is halted and, upon sufficient cooling thereof to achieve hardening of the thermoplastic resin layer for bonding diaphragm member 12A to frame member 14A, overhead support 28A is raised to permit removal of the diaphragm assembly 11A from the apparatus.

After trimming away of the diaphragm member 12A extending beyond frame member 14A, an electric charge is applied to the diaphragm member so that the latter constitutes an electret. The resulting diaphragm assembly 11A may be installed in the push-pull type electro-acoustic transducer 10 of FIG. 2, in which case a frame member or spacer ring which is separate from the assembly 11A is installed in place of the frame member 13 of assembly 11 for spacing the diaphragm member 12A from fixed electrode 19.

Further, the diaphragm assembly 11A may be employed in an electro-acoustic transducer of the type (not shown) having a single fixed electrode. In this latter case, a metal layer, for example, of aluminum, gold or the like, may be vapor deposited on the surface of layer 12'A of the diaphragm member 12A within frame member 14A to form the second electrode of the transducer, and the diaphragm assembly 11A is mounted with the layer 12"A facing toward, and spaced from the single fixed electrode. Of course, the diaphragm assembly 11 of FIGS. 1 and 2 may be similarly adapted for use in an electro-acoustic transducer having a single fixed electrode by vapor-depositing a metal layer on the surface of diaphragm member 12 which is to face away from the single fixed electrode in the assembled transducer.

In the above described embodiments of the invention, the diaphragm member 12 or 12A has been formed of one or more layers of plastic resin which is an electrical insulator and which can retain an electric charge to constitute an electret. However, the method according to this invention can also be employed in the production of a diaphragm assembly constituted by a metal diaphragm member which is supported by a frame member or frame members bonded to one or both surfaces, respectively, of the diaphragm member adjacent the periphery of the latter. For example, in the electro-acoustic transducer 10 of FIG. 2, the diaphragm member 12 may be formed of a thin metal foil, in which case a suitable electrical connection is provided for applying a D.C. voltage to such metal foil diaphragm member for maintaining an electric charge thereon. If the diaphragm member is formed of a metal foil, as aforesaid, a layer of thermoplastic resin is provided between each metal frame member and the surface of the metal foil diaphragm member to be bonded thereto, and each metal frame member is then heated and pressed against the diaphragm member so that the interposed thermoplastic resin will melt and, after cooling, will bond together the diaphragm and frame members.

In the illustrated embodiments of the invention, each of the metal frame members 13 and 14 or 14A has been heated by transfer of heat thereto from the locating member 25 or 26. However, it will be apparent that each metal frame member may be heated instead by the passage of an electric current therethrough during the bonding operation.

Although illustrative embodiments of the invention and modifications thereof have been described in detail herein, it is to be understood that the invention is not limited to those precise embodiments and modifications, and that various changes and further modifications may be effected therein by one skilled in the art without departing from the scope or spirit of the invention as defined in the appended claims.

What is claimed is:

1. The method of assembling at least one metal frame member in abutting supporting relation to a diaphragm member to form an electret assembly for an electro-acoustic transducer, comprising the steps of forming said diaphragm member as a lamination of a film of polytetrafluoroethylene and a layer of fluorinated ethylene-propylene at each side of said film which, in said abutting supporting relation, faces toward a surface of each said frame member, pressing together said frame and diaphragm members in said abutting supporting relation while heating each said metal frame member so that heat transmitted through the latter causes said fluorinated ethylene-propylene to melt at the portion thereof engaged by each said metal frame member, halting the heating of each said frame member so that said fluorinated ethylene-propylene hardens to bond said frame and diaphragm members to each other in said abutting supporting relation, and electrically charging said diaphragm member so that the latter and each said frame member bonded thereto provides an electret assembly.

2. The method according to claim 1; in which there is only one metal frame member which, in said abutting supporting relation, engages against one side of said diaphragm member, and a heat insulating member is engaged against the opposite side of said diaphragm member only during the pressing together of said frame and diaphragm members.

* * * * *